United States Patent
Graf et al.

[15] 3,694,718
[45] Sept. 26, 1972

[54] METHODS OF INVERTER VOLTAGE CONTROL BY SUPERIMPOSED CHOPPING

[72] Inventors: Carlton E. Graf, Harborcreek; Werner K. Volkmann, Fairview, both of Pa.

[73] Assignee: General Electric Company

[22] Filed: Oct. 19, 1970

[21] Appl. No.: 81,758

[52] U.S. Cl. ............... 318/227, 318/230, 318/231, 321/5, 321/9 A
[51] Int. Cl. .................................... H02p, H02m
[58] Field of Search ............ 321/5, 9 A, 9 R, 18, 19; 318/227, 230, 231, 341, 345

[56] References Cited

UNITED STATES PATENTS

| 3,551,779 | 12/1970 | Campbell | 321/5 |
|---|---|---|---|
| 3,585,488 | 6/1971 | Gutt et al. | 321/9 A |
| 3,538,420 | 11/1970 | Klein | 321/9 A |
| 3,324,374 | 6/1967 | Corey | 321/9 A |
| 3,423,662 | 1/1969 | Schlabach et al. | 321/9 A |
| 3,443,196 | 5/1969 | Horner | 321/9 A |
| 3,523,236 | 8/1970 | Howell et al. | 321/9 |
| 3,260,912 | 7/1966 | Gregory | 318/345 |

FOREIGN PATENTS OR APPLICATIONS

6,709,086  1/1968  Netherlands .................. 321/5

Primary Examiner—William H. Beha, Jr.
Attorney—James C. Davis, Jr., George R. Powers, Frank L. Neuhauser, Oscar B. Waddell and Joseph B. Forman

[57] ABSTRACT

An adjustable speed polyphase a-c motor drive featuring an inverter in which the same power switching devices, typically SCRs, are controlled to provide both variable frequency and variable voltage polyphase power to the motor. This is accomplished by sequentially operating selected switching devices in a time ratio controlled mode of operation within the principal polyphase operation thereof. During successive 60 electrical degree intervals in a three phase inverter, the switching devices of two phases are connected to a source of electrical potential of one polarity and a switching device of the remaining phase is connected to a source of electrical potential of the other polarity is subjected to time ratio controlled switching.

7 Claims, 4 Drawing Figures

METHODS OF INVERTER VOLTAGE CONTROL BY SUPERIMPOSED CHOPPING

This invention was made in connection with variable speed electric drives of the kind wherein a polyphase a-c motor is supplied with variable frequency, variable voltage power to produce corresponding variable speed operation of the motor. The invention further relates to a power conversion circuit that is particularly adapted for use in supplying such power to a polyphase motor.

By way of example only, this invention will be described as it relates to series inverter circuits which convert unidirectional or direct current (d-c) electrical power to polyphase alternating current (a-c) electrical power. Such inverters normally employ electrical switching means of some type, as semiconductor controlled rectifiers (SCRs) or similar solid state devices, to convert the d-c power to a-c power, as well as to control the magnitude of power which is supplied. The electrical switches are connected in series in the main current conducting paths from the d-c power source to each of the phases of the polyphase utilization means, and these electrical switches are opened and closed to produce a-c power from the d-c power. In addition to the basic need for controlling these electrical switches to produce the a-c power, many applications of inverter circuits also require the control of these electrical switches to determine the magnitude of a-c power which is conducted from the d-c source to the utilization means. In the case of a polyphase a-c motor, for example, it is known that the average voltage applied is advantageously varied linearly with variations in the frequency of the power supplied.

The average magnitude of the applied voltage from inverter circuits can be controlled by time ratio controlled (TRC) switching. That is, the electrical switches of each of the a-c phases are caused to become conducting, or "turned on," or to become non-conducting, or "turned off," in a relatively rapid sequence. Increasing or decreasing the ratio of the "on" time of the switches with respect to the "off" time of the switches produces a change in the same direction in the average value of voltage applied.

It is one object of this invention to provide an inverter control circuit which simplifies the manner in which TRC switching is obtained for the control of a polyphase a-c output voltage.

Control circuits must be provided for turning "on" and turning "off" the switching devices as necessary to switch the output power of the inverter. Because this switching must be accurately controlled to cause the inverter circuit to operate properly, control circuits often become quite complex.

It is another object of this invention to provide a polyphase adjustable frequency conversion circuit wherein the control of the output power is simplified.

Furthermore, presently available gate controlled rectifiers of the type which are used in power conversion circuits normally require commutating circuits to turn them off. These commutating circuits turn "off" a controlled rectifier by forcing current from some energy source (typically a reversely charged capacitor) to supply the electrical energy to the utilization means in place of the gate controlled rectifier during the latter's commutation interval. This process of commutation requires the consumption of electrical energy, much of which is not usefully delivered to the utilization means.

It is still another object of this invention to provide a polyphase inverter circuit having a reduced number of required commutations of gate controlled rectifiers, while at the same time controlling the output power by means of time ratio controlled switching.

SUMMARY OF THE INVENTION

Briefly stated, and in accordance with one aspect of the invention, the above objects are accomplished in a three-phase conversion circuit by using the same electrical switching means to conduct electrical power between the unidirectional power supply and each phase, in the customary polyphase relationship, and to also provide time ratio control. The time ratio controlled switching occurs sequentially in each phase of the conversion circuit. The switching means of the three phases are controlled so that during any selected period of time one phase of the conversion circuit is normally connected to one potential of the power supply, while the other two phases are both normally connected to another potential of the power supply. Control means cause the switching means of whichever phase is connected to the one potential to switch in a time ratio controlled manner during this period of time. Thus the voltage of each phase is periodically time ratio controlled, such switching occurring in each phase at a time when this phase is connected to a potential which is different from that of the other two phases.

In the illustrated embodiment of this invention, the three-phase conversion circuit is used in an inverter circuit which converts d-c electrical power from a power supply into three-phase a-c electrical power for use by a three-phase a-c motor. The switches are further controlled so that there is the customary 120 electrical degree time displacement between the voltages of the respective phases. To obtain time ratio controlled switching of the output power of the inverter circuit, switching control means cause electrical switches of each phase to switch the output voltage of each phase during the middle 60 electrical degree portion of each half cycle of the particular phase. During such switching portion of each half cycle, the other two phases are connected together and to a terminal of the source that has a voltage that differs from that of the terminal to which the time ratio controlled phase is intermittently connected; allowing the electrical switches of a single phase to control the power supplied to all three phases. Preferably the time ratio controlled switching is precisely synchronized with the fundamental frequency to provide symmetrical half-cycle wave shapes.

The specification concludes with claims particularly pointing out and distinctly claiming the subject matter of this invention. The organization and manner and process of making and using this invention, together with further objects and advantages thereof, may be best understood by referring to the following description which should be taken in conjunction with the accompanying drawings. Like parts in each of the several figures of the drawings are identified by the same reference character.

DETAILED DESCRIPTION

While the electrical power conversion circuit of this invention is not necessarily limited to any single type of system, this invention will be described with respect to a d-c to three-phase a-c inverter power supply. Referring now to the simplified schematic diagram of FIG. 1, electrical switches of an inverter power circuit 12 are controlled to cause power to be supplied from a d-c source 14 to a power utilization means, or load, 16 which is adapted to be energized from a-c power. Any convenient d-c source may be used, such as a storage battery or a rectifier circuit for converting the output voltage of an alternating-current source to unidirectional d-c voltage. While the load 16 can comprise any device which utilizes a-c power, such as a resistance or induction heating furnace, it might typically be a dynamoelectric machine such as a polyphase induction or synchronous motor.

Figure 1:
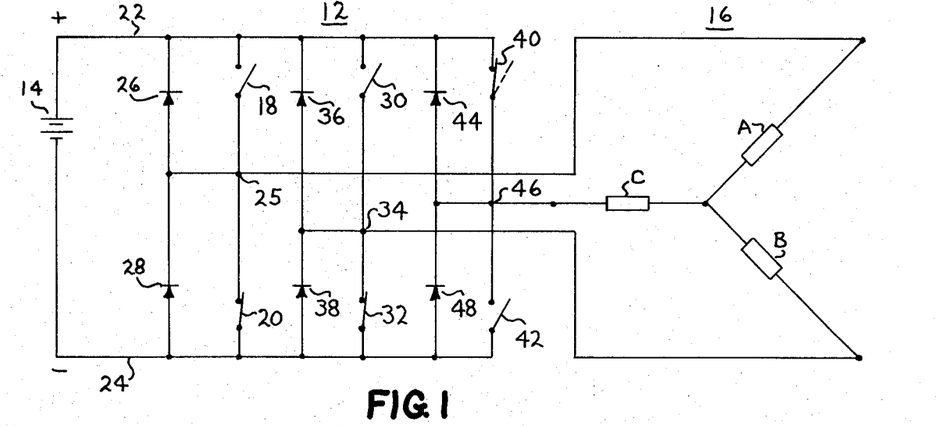
FIG. 1 is a simplified schematic diagram of an inverter power circuit and is used to describe the basic principles of the inverter control system of this invention.

The inverter power circuit basically comprises electrical switching means for carrying load current for each phase of the inverter circuit, shown as a series connected pair of electrical switches connected across the d-c source 14. While many types of electrical switches can be used, these switches would normally comprise gate controlled rectifiers, as SCRs or the like. However, they are shown schematically as mechanically operated switches for simplicity in explaining the fundamental principals of this invention. Each of these gate controlled rectifiers normally has an uncontrolled diode or rectifier connected in parallel with it in a reverse polarity relationship, these rectifiers being commonly referred to as feedback and/or clamping diodes.

Phase A of the inverter power circuit 12 includes electrical switches 18 and 20 connected in series across a positive supply conductor, or bus, 22 and a negative supply conductor, or bus, 24. It will be appreciated by those skilled in the art that positive and negative terminals are relative terms used for convenience herein to designate terminals of different electrical potential, with the positive terminal ordinarily having the higher of the two potentials. The feedback rectifiers for the electrical switches 18 and 20 comprise diodes 26 and 28, respectively, which provide a path for reactive load current and limit reverse voltage when the respective switches are opened. While these feedback rectifiers are shown as diodes in the present embodiment of this invention, they can comprise gate controlled rectifiers as well where preferable for the total inverter power supply. The electrical switch 18 is connected from a point 25, leading to the phase A load, to the positive bus 22. The electrical switch 20 is connected from the point 25 to the negative bus 24.

Similarly, phase B includes a pair of series connected electrical switches 30 and 32 connected across the positive bus 22 and the negative bus 24, with point 34 being connected to the common terminal of these switches. Diodes 36 and 38 are connected across the electrical switches 30 and 32, respectively.

In like manner to phases A and B, phase C includes electrical switches 40 and 42 which are connected across the positive and negative buses 22 and 24. The switch 40 has a diode 44 connected across it. The anode of diode 44 is connected to the common terminal 46 of the switches and its cathode is connected to the positive bus 22. The switch 42 has a diode 48 connected across it from the point 46 to the negative bus. Phases A, B, and C of the load 16 are coupled to the mid-points 25, 34, and 46, respectively, of the inverter in any convenient manner, as by being directly connected thereto as shown.

In accordance with one aspect of this invention, the conversion circuit minimizes the number of switching operations which must occur to time ratio control switch the output voltage of the three-phase inverter power circuit 12 by determining for any period of operation which of the three output phases of the inverter is normally at a polarity which is opposite to that of the other two phases. The electrical switches for this phase are then controlled to provide the switching operation required for voltage control. FIG. 1 is used to illustrate the manner in which the voltage switching occurs for the commonly used three-phase voltage relationship. The electrical switches normally connect each phase of the load to the positive polarity bus 22 for one half cycle, or 180 electrical degrees, and normally connect the load to negative polarity bus 24 for the other half cycle, or 180 electrical degrees. These connections of the three phases A, B and C are displaced relatively in time by 120 electrical degrees, as is customary.

The electrical switches of FIG. 1 are in positions which they would assume during a first interval of time in the voltage diagrams of FIG. 2 wherein waveforms 49 and 51 illustrate control functions to be described later. The portion of the voltage cycle starting at a point 50 in the phase A voltage wave 53 will be discussed in conjunction with FIG. 1. The time scales are identical in FIG. 2 with corresponding instants of time aligned vertically for each of the voltage waveforms. The phase voltage diagrams in conjunction with FIG. 1 show that at this point 50 in the output voltage cycle, the phases A and B are normally connected to the negative bus 24 by means of the electrical switches 20 and 32, respectively. Phase B is omitted from FIG. 2 for simplicity. Phase C waveform 55 indicates that phase C is normally connected to the positive bus 22 by means of the switch 40 at this time. Since phase C is during this interval opposite in polarity to phases A and B, in accordance with this invention the voltage of phase C is intermittently interrupted by opening and closing the switch 40 to provide average voltage control for the inverter. The actuation of switch 40 to the open position is indicated by showing the switch arm in a dotted position in FIG. 1.

While the switch 40 is closed, the positive bus 22 is connected through switch 40 to the phase C circuit. The circuit is completed through phases A and B and through the closed switches 20 and 32, respectively, to the negative bus 24. After a period of time determined by a time ratio control portion of the control circuits of the inverter power supply, the switch 40 is opened, as indicated by the dotted line position in FIG. 1. For an inductive load, as described, the current persists, or "free wheels," through the feedback diode 48 so that mid-point 46 and phase C are effectively connected, or "clamped," to the negative bus 24. A point 52 on the phase C voltage diagram of FIG. 2 indicates the beginning of such a time interval, when phase C is clamped to the negative bus by the diode 48. The switch 40 is closed once again after a period of time determined by the required ratio of "on" time versus "off" time for the inverter circuit; that is, determined by the desired average voltage to be applied to the load 16. This closing of the switch 40 is indicated by a point 54 of the voltage diagram for phase C.

The opening and closing of switch 40, or "chopping" as it is known to those skilled in the art, in phase C continues until the control system determines that it is time to change the polarity of the voltage in one of the phases, phase B in the present example. The switch 40 is turned on once again at a point 56, thereafter the switch 32 in FIG. 1 is opened and the switch 30 is closed to connect phase B to the positive bus 22. An inspection of the phase voltage diagrams of FIG. 2 immediately following the point 56 in phase C shows that phases B and C are now positive in polarity, while phase A is normally negative in polarity. In accordance with this invention, the voltage of phase A is now TRC chopped, as by operating switch 20, to obtain voltage control.

Figure 2:
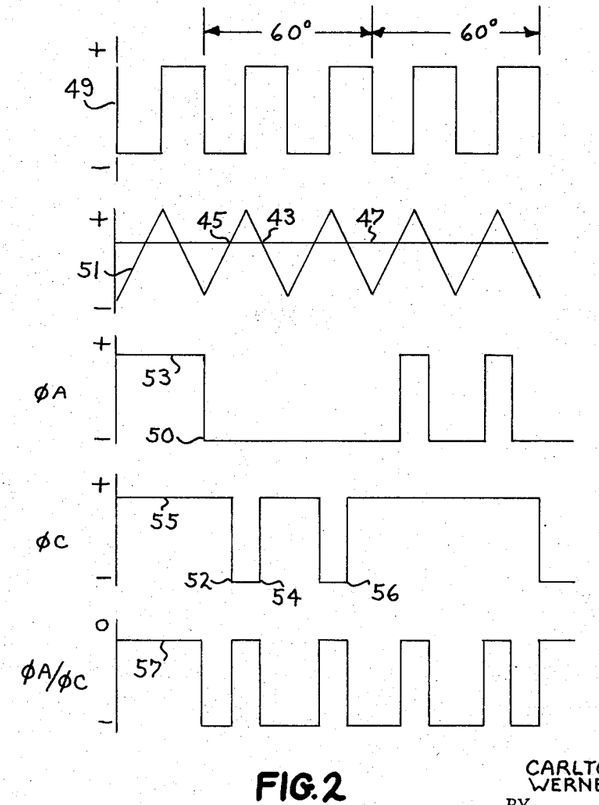
FIG. 2 shows a plurality of graphs, having voltage represented by the ordinates and time represented by the abscissas, illustrating the synchronizing, phase, and phase-to-phase voltages according to a preferred embodiment of this invention.

In a three-phase inverter power supply such as that described in conjunction with FIGS. 1 and 2, the individual phase voltages are at one potential during one half cycle, or 180 electrical degrees, and are at another potential during the other half-cycle. The phase voltages are displaced in time 120 electrical degrees with respect to each other. Thus the output voltage of each phase is opposite in polarity to that of the other two phases during the middle 60 degree portion of each half-cycle of the phase voltage. For this reason, in accordance with this invention, the output voltage of each phase is chopped in a time ratio controlled manner during this middle 60 electrical degree portion of its half-cycle. As indicated, the switch 18 is actuated to chop the middle 60 degree portion of the positive polarity output wave of phase A, while the switch 30 is used to chop the middle 60 degree portion of the positive polarity output wave of phase B. An inspection of the phase A-to-phase C voltage waveform 57 indicates that voltage chopping occurs during 120 of each 180 electrical degrees, or half-cycle, of each phase-to-phase voltage, even though the chopping occurs in only a single phase at any one time and during 60 electrical degree intervals therein.

Figure 3:
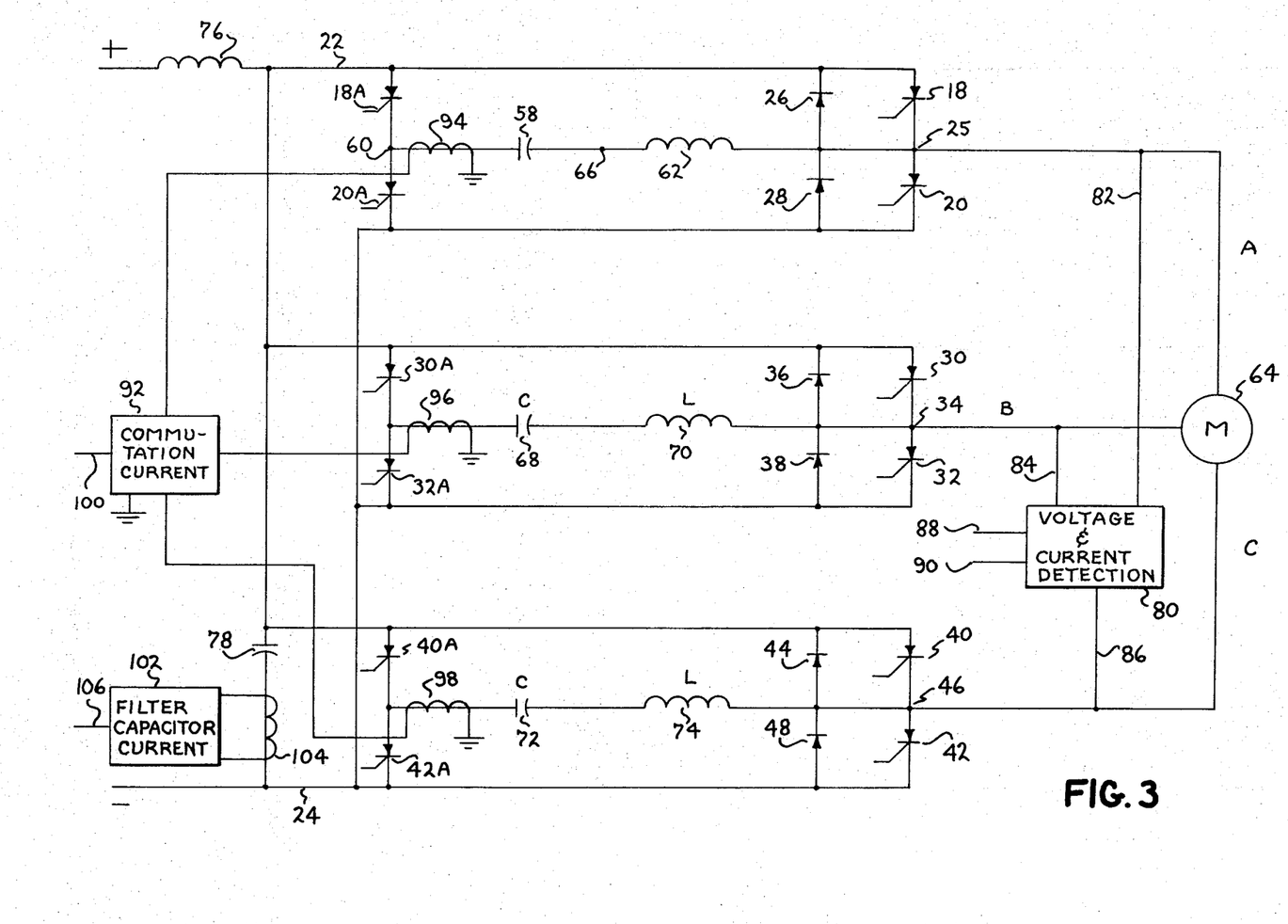
FIG. 3 is a schematic circuit diagram of an inverter power circuit preferred for use in accord with this invention; and, FIG. 4 is a block diagram of the switching and control means in a preferred embodiment of the invention.

FIG. 3 shows an example of one of the many types of commutating circuits which may be used to control the conduction of the load current carrying electrical switches where these switches comprise semiconductor gate controlled rectifying devices such as silicon controlled rectifiers. While the operation of this commutating circuit will be described below, complete details concerning its operation can be obtained, if desired, in U.S. Pat. No. 3,207,974 to W. McMurray, entitled, "Inverter Circuits."

Referring now to the commutation circuit for the controlled rectifiers 18 and 20 which supply load current for phase A, each of these controlled rectifiers is commutated off by firing an auxiliary gate controlled rectifier, thereby producing a pulse of commutating current that reduces the current in a load current carrying controlled rectifier to below the holding level. The commutation circuit itself comprises a series circuit including a pair of commutation gate controlled rectifiers 18A and 20A connected in series from positive bus 22 to negative bus 24. One terminal of a commutating capacitor 58 is connected to a junction 60 between the controlled rectifiers 18A and 20A, and the other terminal of the commutating capacitor 58 is connected through a commutating inductor 62 to the junction point 25.

Briefly, the operation of the commutating circuit for phase A is as follows: Assume that the main controlled rectifier 18 is conducting current to a load such as a motor 64. As a result of the previous half-cycle of operation, the commutating capacitor 58 is charged such that a point 66 between the capacitor 58 and the inductor 62 is positive in potential with respect to the junction 60. To commutate the controlled rectifier 18 "off," the commutating controlled rectifier 18A is turned "on," as by receiving firing signals from phase A commutation firing circuits to be described in conjunction in the FIG. 4. A series oscillatory circuit comprising the commutating capacitor 58 and the commutating inductor 62 is now connected across the load current carrying controlled rectifier 18. A current pulse produced by the discharging series oscillatory circuit takes over the function of supplying load current to the motor 64 and causes the diode 26 to be forward biased. As a result, the current through the controlled rectifier 18 is reduced to zero. The feedback diode 26 conducts excess commutation current around the controlled rectifier 18 and provides a limited reverse bias across the controlled rectifier 18. This reverse bias lasts for a period greater than the turn-off time of the controlled rectifier 18 so that this controlled rectifier is caused to turn "off," i.e., to regain its blocking mode of operation.

After the commutating capacitor 58 has been charged to the opposite polarity, so that the junction 60 is more positive in potential than the positive bus 22, the commutating controlled rectifier 18A turns off. Since the controlled rectifier 18 is now turned off, reactive current circulates through the opposite feedback diode 28. The main controlled rectifier 20 can also be fired, if desired, at this time by applying firing signals to its gate electrode. The commutating capacitor 58 thereafter has the appropriate polarity to commutate "off" this controlled rectifier when the commutating controlled rectifier 20A is turned on. After the controlled rectifiers 20 and 20A are turned "off," the controlled rectifier 18 is turned "on" and the capacitor 58 is charged to the same polarity as it was at the start of the commutation interval. Thus the commutating circuit is ready to begin another commutation of the controlled rectifier 18.

Phases B and C of the inverter shown in FIG. 3 comprise commutation circuits which are identical to that shown for phase A. phase B includes auxiliary commutating controlled rectifiers 30A and 32A which can be fired to commutate off the controlled rectifiers 30 and 32, respectively. The series oscillatory circuit for phase B includes a commutating capacitor 68 and a commutating inductor 70. For phase C, auxiliary commutating controlled rectifiers 40A and 42A are used to control the commutation of the load controlled rectifiers 40 and 42, respectively. The series oscillatory circuit for phase C comprises a commutator capacitor 72 and a commutating inductor 74.

While d-c power can be supplied through busses 22 and 24 in any convenient manner, it is typically supplied through the use of rectifying circuits such as a full wave bridge rectifier connected to an a-c power source. A filter circuit for the d-c power is advantageously utilized in such case and comprises an inductor 76 connected in series from a positive polarity terminal of the power supply to the positive bus 22 to isolate the inverter from the d-c power supply during transient operation conditions of the inverter. The filter also includes a capacitor 78 connected from bus 22 to bus 24.

Inverter circuits are controlled in accordance with this invention in response to voltage and current levels which occur during the operation of these inverter circuits. The output current level of the three-phase inverter circuit is sensed by a current detection circuit 80 which is shown schematically to be coupled to the output conductors of phases A, B and C by means of conductors 82, 84 and 86, respectively. The detection circuit 80 may comprise any of the well-known circuits for measuring the a-c output current and may include current sensing shunts or inductors (current transformers) which are coupled to output conductors of each phase. Signals representing the output current of the inverter circuit are coupled from a conductor 90 of the detection circuit 80.

The output voltage of the inverter may be sensed by any convenient means, such as a voltage detection circuit connected to the output conductors of each of the three phases of the inverter circuit. Conductors 82, 84 and 86 additionally represent part of the voltage sensing means in the schematic diagram of FIG. 3 and the output from the voltage sensing means is illustrated by conductor 88.

The current flowing through the commutating circuits for each of the phases is detected by a commutation current circuit 92. The current is picked up by current sensors 94, 96 and 98 coupled to the series oscillatory circuit for phases A, B and C respectively. Signals representing the commutation current level of the three phase inverter circuit are coupled from an output conductor 100 of the commutation current circuit 92. The level of current flowing through the filter capacitor 78 is detected by a filter capacitor current circuit 102 having a current sensor 104 coupled in series with the capacitor 78 and having an output conductor 106 which carries signals representing the filter capacitor current level.

Figure 4:
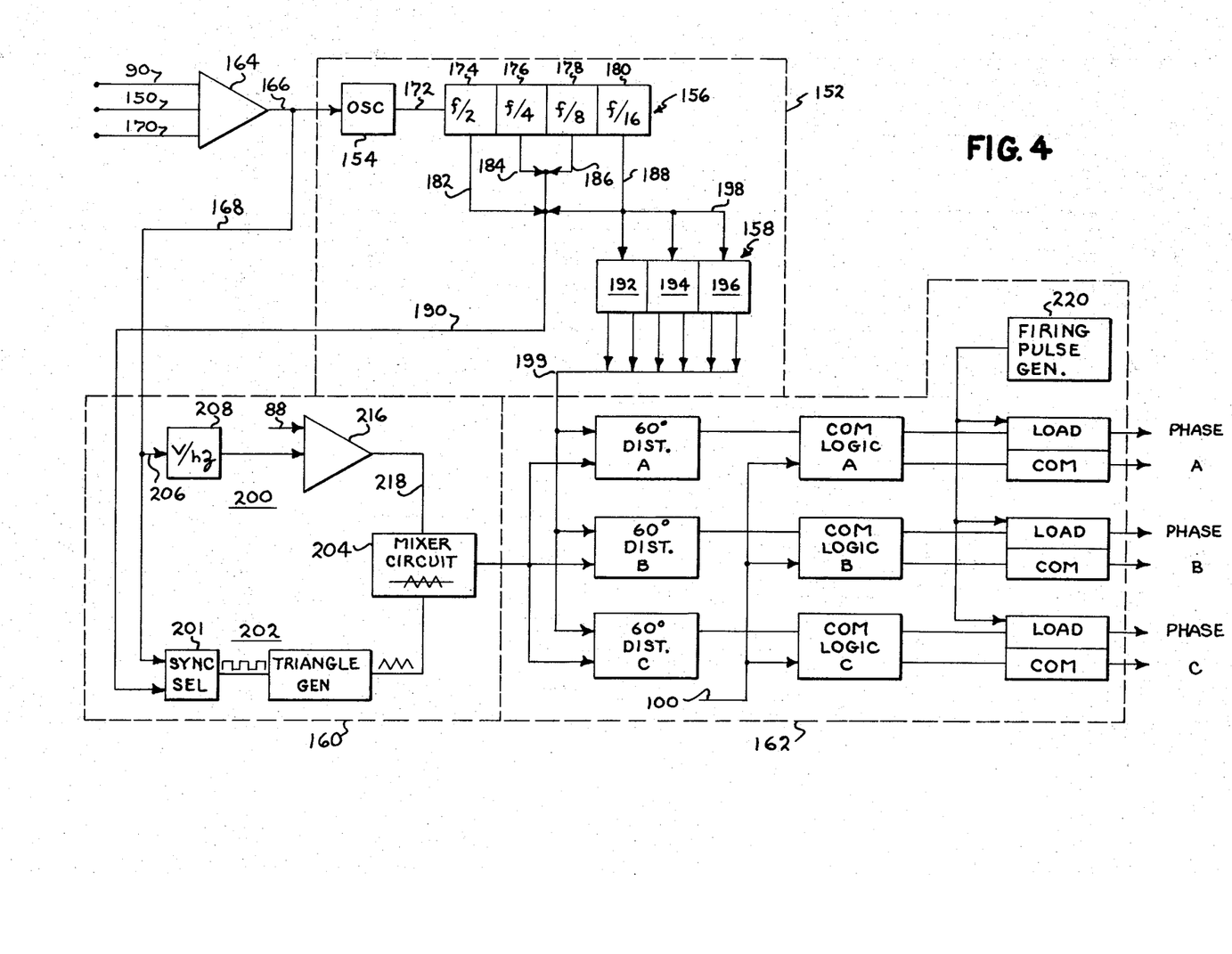

FIG. 4 is a block diagram showing a control system which controls the firing of both load and commutating controlled rectifiers in accordance with the principles of this invention. The control system itself responds to a command signal representing the desired performance of the load motor, the motor 64 of FIG. 3 in the present example. This command signal, which is coupled to the control system through a conductor 150, is used in determining the inverter output frequency which is applied to the motor 64, the chopping frequency of the output voltage, and the ratio of the "on" and "off" times for time ratio controlled regulation of the output voltage level.

The output frequency and the chopping frequency of the inverter are determined by a frequency generator 152 which comprises a combination of a voltage controlled oscillator 154, a frequency divider 156, and a three-phase generator 158 that can be a shift register, for example. A time ratio control regulating circuit 160 responds to the command signal to determine the output power level of the inverter circuit by determining the relative "on" and "off" times of the load-current carrying controlled rectifiers. A rectifier firing control circuit 162 responds to both the three-phase signal generator 158 of the frequency generator 152 and to the TRC regulating circuit 160 to insure that the appropriate load and commutating controlled rectifiers are fired so as to obtain the advantages of this invention.

The command signal which is coupled to the conductor 150 can be obtained from any source which is convenient for indicating the desired output of the inverter system. For example, it can be obtained from the slide-wire of a potentiometer which is biased by a regulated power supply, with the position of this slide wire varied in accordance with the desired speed of a motor drive. The command signal might also be obtained from the output of a computer or from a tachometer driven by a master drive of a multi-drive system or from other sources. The command signal is coupled through a command and input signal combining buffer amplifier 164 to conductors 166 and 168 which lead to the frequency generator 152 and the TRC regulating circuit 160, respectively.

The output of the command amplifier 164 may be affected not only by the command signal, but also by a current limit signal such as that from conductor 90 of FIG. 3, or by regeneration limit signal at conductor 170.

The current limit signal at the conductor 90 comprises a signal which indicates that the level of the actual current flowing in the motor 64 of FIG. 3 is above a preselected level, such as 150 percent of the rated current level. This signal occurs only during the motoring operation of the motor control system and at a time when the motor current is above the preselected level. The polarity of the signal is such that it tends to reduce the speed at which the motor is operating, that is, the current limit circuit tends to modify the speed requested by the command signal at the conductor 150 to a lesser level of speed.

The regeneration limit signal at the conductor 170 can be present only during a regenerative operation of the motor 64 of FIG. 3, that is, at a time when the motor 64 is returning power back to the d-c power source. During this period of time, the returning power tends to charge the filter capacitor 78. If for some reason the voltage cannot be dissipated by the d-c source as rapidly as it is supplied by the motor and through the power controlled rectifiers, this voltage level on the filter capacitor charges up to an unsatisfactory level which may cause failure of some of the controlled rectifiers and/or other components, as capacitor 78.

The regenerative overvoltage limit circuit senses the voltage which is developed across the filter capacitor and compares this voltage with a voltage representing the level of the d-c source voltage of the inverter circuit. When the voltage developed across the filter capacitor is a preselected amount greater than the voltage developed at the d-c source, a regenerative limit signal is developed at the conductor 170.

The regenerative overvoltage condition develops because the inverter control system is attempting to decelerate the drive motor too rapidly. Thus, the regenerative limit signal tends to increase the frequency of the inverter so as to cause the motor to decelerate more slowly as it is returning power back to the d-c source.

The actual output frequency of the inverter is determined by the voltage controlled oscillator 154 of the frequency generator 152 in response to the output signal level of the command amplifier 164. As explained above, the output of this command amplifier 164 is determined by the level of the command signal, possibly modified by the current limit signal or the regenerative limit signal at the conductors 90 and 170, respectively. The voltage controlled oscillator 154 comprises any one of a plurality of well-known highly stable oscillators of the voltage controlled type which produces an output frequency which is some multiple of the actual output frequency of the inverter circuit. In a three phase embodiment of the invention, the oscillator output is conveniently selected to be a square wave having a frequency 96 times the desired output frequency.

The output from the oscillator 154 is coupled through a conductor 172 to the frequency divider 156 comprising individual flip-flop stages 174, 176, 178 and 180 for dividing the output frequency of the oscillator 154 by two, four, eight and 16 respectively. By flip-flop I mean a conventional electronic logic element which has two stable electronic states which occur alternately upon the receipt of a plurality of successive input signals from the oscillator 154. The connections of such elements to accomplish the indicated simple divisions by two are well known to those skilled in the art.

The outputs from the frequency divider 156 are shown for schematic purposes to be connected to a conductor 190 leading to the TRC regulating circuit 160. The TRC regulating circuit 160 selects which of the output signals from the frequency divider 156 it requires to provide the proper time ratio controlled chopping for the inverter. In the preferred embodiment illustrated, the command frequency signal is supplied via conductor 168 to the synchronizing generator 201 and the selection of chopping frequency multiple depends upon the magnitude of the inverter frequency. The highest multiple, eight, is used from line 182 at the lowest inverter frequency of operation, and the lowest multiple, one, is used from line 188 at the highest frequency of operation. The multiples selected determine the number of TRC operations during a given 60 electrical degree period of operation of the inverter. It will be appreciated that the maximum reliable switching speed of the switching devices puts an upper limit on the number of TRC operations that can be performed. Also, wave shape is a factor favoring higher multiples and, conversely, conservation of commutation energy favors lower multiples.

The three-phase generator 158 may comprise any convenient device, as a shift register, for providing an output signal each time the voltage of one of the output phases A, B and C is to change its polarity at the end of one half cycle of the output voltage for this phase and the beginning of a second half-cycle of this voltage. Since in the present embodiment of this invention there are three output phases which are displaced by 120 electrical degrees and since the voltage at each of these phases remains at one polarity for 180 electrical degrees and then switches to the opposite polarity for 180 electrical degrees, it follows that the three-phase generator 158 produces six equally spaced pulses during any 360 electrical degree interval. These pulses must be distributed in sequence to each of the phases.

The three-phase generator 158 shown in FIG. 4 comprises three flip-flops 192, 194, and 196, each of which receive each of the input signals from a conductor 198 which is connected to the output conductor 188 of the flip-flop 180. The flip-flops are interconnected such that each time a pulse is received from the flip-flop 180 of the frequency divider 156 only one of the flip-flops of the three-phase generator 158 operates. The result is a rectangular waveform for each phase that alternates in polarity and is related to the other phase waveforms in a manner analogous to the customary polyphase power supply featuring sine waveforms. The manner of interconnecting flip-flops of this type to obtain the desired sequential operation is well known to those skilled in the art and thus will not be described in detail.

For schematic purposes, the signals from the phase generator 158 are shown as being conducted through a conductor 199 to the rectifier firing controlled circuit 162 where the three-phase signals are distributed to the three output phases. Suffice it to say, that the flip-flop 196 produces output signals corresponding to phase A, while the flip-flop 194 produces output signals corresponding to phase B, and the flip-flop 192 produces output signals corresponding to phase C. Where an a-c motor is the load for an inverter circuit, the interconnections of the three flip-flops in the three-phase generator can be switched to provide for motor reversing.

The TRC regulating circuit 160 responds to the output of the command amplifier 164 to determine the output power level of the inverter circuit by selecting the chopping frequency of the inverter and determining the "on" and "off" times of the load-current carrying controlled rectifiers. The output of the command amplifier 164 is coupled through the conductor 168 to two channels of the TRC regulating circuit 160; one channel 200 which develops a voltage reference signal and the other channel 202 which develops a triangular shaped voltage signal, as by combining a synchronous rectangular waveform selector 201 with a triangle generator that can be an integrating amplifier, for example. The voltage reference and the triangle voltage are compared in a mixer circuit 204, and at the intersection of these two voltages, signals are developed to control the "on" and the "off" times of the chopping which occurs in the output of the inverter circuit.

The conductor 168 connects the output of the command amplifier 164 to the voltage reference channel by way of a conductor 206. The voltage reference channel basically comprises a voltage per hertz compensating network 208 that can be a resistance voltage divider, for example, that conveniently includes an adjustable potentiometer for varying the proportion of voltage received at input 206 which appears at the output of network 208. Amplifier 216 compares the output from the volts per hertz network 208 with a d-c feedback signal from conductor 88 that is proportional to average motor voltage. The output from the amplifier 216 comprises the voltage reference signal which is coupled through a conductor 218 to the mixer circuit 204.

OPERATION

Explanation of the operation of the preferred embodiment of this invention will be described commencing with receipt of a command signal at line 150 in FIG. 4. Such a command signal indicates, by its magnitude, the desired speed of the drive. The primary control of drive speed in response to the command signal is determined by the operating frequency of the inverter. Accordingly, the command signal, plus any modification indicated by secondary inputs on lines 90 and 170, appears at the output of buffer amplifier 164 and is received as an input through conductor 166 by oscillator 154. Oscillator 154 is conveniently selected to be a trigger pulse generator in which the frequency of pulses appearing at its output 172 varies substantially linearly with the magnitude of input voltage received. The next step in the primary control loop is division of the output from oscillator 154 in frequency divider 156. The final division in the frequency divider 156 (illustrated to be a division by 16) provides trigger pulses of such lower frequency to the phase generator 158. The phase generator 158 performs one switching function for each trigger input received and functions as a shift register to provide three signals having rectangular waveforms and corresponding to the individual phase voltages of a conventional polyphase power supply. Thus it will be appreciated that six trigger inputs from frequency divider 156 result in one complete operation, or cycle, of phase generator 158. Accordingly, in the descriptive embodiment, the fundamental frequency of the polyphase inverter is established at 196 (six times 16 ) the operating frequency of oscillator 154.

In order to provide control of the main switching elements of the inverter in accordance with this invention, there is advantageously provided a distributor logic network for implementing the basic switching commands from phase generator 158 and additionally selecting the appropriate switch to be time ratio controlled during appropriate intervals. The distributor logic conveniently utilizes conventional integrated circuit modules in a manner well known to those skilled in the art. In accordance with this invention the phase A distributor senses when phase B and phase C are negative and during the coincidence of such event connects the TRC trigger pulses from mixer circuit 204 to control the positive phase A inverter switch (switch 18 in FIG. 1). Conversely, when phase B and phase C are positive the TRC control is applied to the negative phase A inverter switch (switch 20 in FIG. 1). In like manner, the phase B logic distributor connects the TRC control to the positive phase B switch during the interval when phases A and C are both negative and connects the TRC control to the negative phase B switch during the intervals when phases A and C are positive. The logic distributor for phase C implements TRC control of the positive phase C switch during the interval when phases A and B are both negative and commands TRC switching of the negative phase C switch during the interval when phases A and B are both positive.

In accordance with the foregoing control the six primary inverter switches are TRC controlled sequentially, one at a time, during the middle 60 electrical degree portion of their respective polyphase waveforms. Thus, the TRC switching is divided equally among the six primary inverter switching means during any given 360 electrical degree cycle of inverter operation.

The commutating logic blocks perform the primary function of a lockout. More specifically, the commutating logic contains a commutation current detector supplied by conductor 100 and a time delay switch to insure completion of a signaled commutation before enabling the control circuit to apply further firing signals to the principal inverter switching devices. The firing pulse generator 220 provides the trigger pulses which are actually gated to control the commutating and load-carrying SCR's.

While the primary speed control functions to provide a fundamental inverter frequency of operation that varies in accordance with a desired speed of motor operation as indicated by the magnitude of command signal, a secondary TRC function controls the actual power applied to the load. For example, it is known that in the case of a polyphase a-c motor, the basic principles of magnetism indicate that the applied voltage be varied substantially linearly with the applied fundamental frequency. This is accomplished by selecting a portion of the command signal from amplifier 164 and utilizing this signal to control in accordance with its magnitude the "on" and "off" times for the main power switching means.

Referring to FIG. 2, the relative voltage level 47 represents this proportion of the command signal. The triangular waveform 51 therein is for the purpose of synchronizing the time ratio controlled switch to the fundamental frequency of operation of the inverter. An upward or positive crossing of waveform 51 and waveform 47, as at 45, signals an "off" period for the switching means. Conversely, the negative crossing 43 signals an "on" interval. Thus, if the relative magnitude of signal 47 increases (upwardly) the "on" period of the switching means lengthens relative to the "off" period thereof, resulting in greater output power from the inverter, and vice versa. Since the triangle waveform is synchronized with the primary frequency control of the inverter, the corresponding time ratio control operation is similarly synchronized and results in a symmetrical half-wave inverter output, as illustrated by curve 57. More specifically, referring to waveform 57 in FIG. 2, the multiple selected from frequency divider 156 (FIG. 4) is $f/8$ or 24 times the inverter fundamental frequency as delivered from conductor 186 and, since the TRC signals "off" periods, there are five periods of conduction which are seen to be symmetrical within the envelope of any given phase-to-phase half-cycle. The initial and terminal pulses of such a half-wave are one-half the width of the central pulses, in this case, three pulses. Depending upon whether the selection from frequency divider 156 is $f/16, f/8, f/4$ or $f/2$; the corresponding number of pulses during any such half-cycle will be three, five, nine, or 17, respectively. A synchronous chopping control of this kind is more fully described and claimed in copending application Ser. No. 81,757, filed concurrently herewith and assigned to the assignee of the present application.

Although this invention has been described in connection with a preferred embodiment it will occur to those skilled in the art that many modifications and variations are possible without departing from the spirit and scope of our invention. For example, this invention is applicable to polyphase inverter systems having more than three output phases. Also, alternatively the time ratio control can be duplicated for each of the three output phases, rather than being a single control combined with a distributor as described, although economy of components as well as symmetry of the output phase-to-phase waveforms render the illustrated distributor embodiment currently preferable. Accordingly, it is our intention to include these and other modifications of our invention within the scope of the appended claims.

What we claim as new and desire to secure by Letters Patent of the United States is the following:

1. In a variable speed polyphase a-c motor drive: a primary speed control means comprising an adjustable frequency polyphase inverter having the inverter output coupled to the motor; and, means for time ratio controlling the output power of individual phases of said inverter in response to a command signal that additionally controls the fundamental output frequency thereof, said controlling being applied individually to said phases sequentially in 60 electrical degree intervals.

2. In a three-phase series inverter having two main power switching means per phase, the combination of: means for alternately rendering the switching means of each phase conductive in a permutated sequence wherein during successive 60 electrical degree intervals switching means of two phases are connected to a source of electrical potential of one polarity and a switching means of the remaining phase is connected to a source of electrical potential of the other polarity; and means for time ratio control switching only the switching means of said remaining phase during said intervals to control the average power delivered.

3. The inverter of claim 2 wherein the frequency of operation of said permutated sequence is variable to provide adjustable frequency polyphase power.

4. The inverter of claim 3 including means for sensing the average voltage supplied by said inverter and means responsive to said sensing means to provide time ratio control adapted to maintain the ratio of average voltage to frequency of operation substantially constant.

5. A conversion circuit for conducting electrical power between a power supply and a load, with the power supply having at least first and second sources of potential; three output phases for said conversion circuit with the amount of power conducted by said conversion circuit being controlled by time ratio controlled switching of the phase-to-phase voltage of the load, comprising in combination:
   a. means including electrical switching means for carrying load current for each of said three phases of said conversion circuit, and means for connecting said switching means between the power supply and the load;
   b. first control means operatively connected to said switching means for causing said switching means of one of said phases normally to connect said phase to one of the sources of potential during a selected period of time, said first control means simultaneously causing said switching means of both the other two phases normally to be connected to another of the sources of potential during the selected period of time; and
   c. second control means operatively connected to said switching means of said one phase to cause said switching means to time ratio control switch the voltage of said one phase during the aforesaid selected period of time, said second control means causing said switching means of each of the other phases to time ratio control switch the voltage of these phases during selected periods of time when each of these phases is normally connected to one of the sources of potential while the other two phases are both connected to another of the sources of potential.

6. An a-c adjustable speed electric motor drive comprising: a source of unidirectional electric power; static power conversion means including a plurality of selectively conductive switches for converting said unidirectional electric power to polyphase electric power having a controllably variable fundamental frequency, said switches including positive and negative switches for each output phase; a polyphase a-c motor coupled to the output of said conversion means and energized thereby; and means for controlling the power supplied by said conversion means including means effective during sequential 60 electrical degree intervals to connect one switch only to one polarity of said source and all of the opposite polarity switches of the other phases to the other polarity of said source, said one switch only being time ratio controlled switched during such intervals to control all of the phase-to-phase voltages.

7. The drive of claim 6 wherein said time ratio controlled switching provides a substantially constant available voltage per cycle of polyphase power applied to said motor.

* * * * *